United States Patent [19]

Ridgeway et al.

[11] 4,155,691
[45] May 22, 1979

[54] MOULDING OF DOUGH

[75] Inventors: Geoffrey R. Ridgeway; Norman H. Calvert; Stanley Graham; Colin Ladds, all of Peterborough, England

[73] Assignee: Baker Perkins Holdings Limited, Peterborough, England

[21] Appl. No.: 811,928

[22] Filed: Jun. 30, 1977

[30] Foreign Application Priority Data

Jul. 1, 1976 [GB] United Kingdom ............... 27512/76

[51] Int. Cl.$^2$ ............................................ A21C 11/04
[52] U.S. Cl. ..................................... 425/140; 425/196; 425/220
[58] Field of Search ............... 425/140, 148, 357, 220; 177/50; 425/196

[56] References Cited

U.S. PATENT DOCUMENTS

| 2,165,528 | 7/1939 | Baker et al. | 425/220 |
| 2,538,346 | 1/1951 | Wood | 177/50 |
| 3,010,528 | 11/1961 | Wood | 177/50 |
| 3,469,540 | 9/1969 | Werner | 425/196 X |

FOREIGN PATENT DOCUMENTS

| 630900 | 5/1936 | Fed. Rep. of Germany | 425/220 |
| 472569 | 6/1950 | Italy | 425/220 |
| 20834 | 5/1929 | Netherlands | 425/220 |
| 36867 | 6/1935 | Netherlands | 425/220 |

Primary Examiner—William R. Briggs
Attorney, Agent, or Firm—Sughrue, Rothwell, Mion, Zinn and Macpeak

[57] ABSTRACT

A rotary moulding machine for biscuit dough of the kind comprising a pair of co-operating rolls defining the bottom of a dough hopper, one roll having an embossed surface for feeding dough downwardly and into contact with the surface of the other or moulding roll which is formed with moulding recesses, and a scraper blade mounted to bear against the surface of the latter roll so as to press dough into the moulding recesses and remove excess dough from the remainder of the surface, includes the improvement that the scraper blade is carried by a pivoted mounting capable of infinitely variable adjustment along a path which guides the mounting in a direction having at least a substantial vertical component and a biasing arrangement is provided which exerts a turning moment on the mounting about the pivotal axis so as to press the scraper blade against the surface of the moulding roll. The machine may include a detector for measuring the average weight of resultant moulded dough pieces either directly or indirectly and a power-operated device responsive to the output of the detector for adjusting the position of the mounting in accordance with variations in the average weight. The power operated device may be a servomotor and the path of adjustment of the mounting may be defined by a slot co-operating with a pin defining the pivotal axis, relative movement between the two being controlled by a rotary cam.

8 Claims, 1 Drawing Figure

U.S. Patent
May 22, 1979
4,155,691
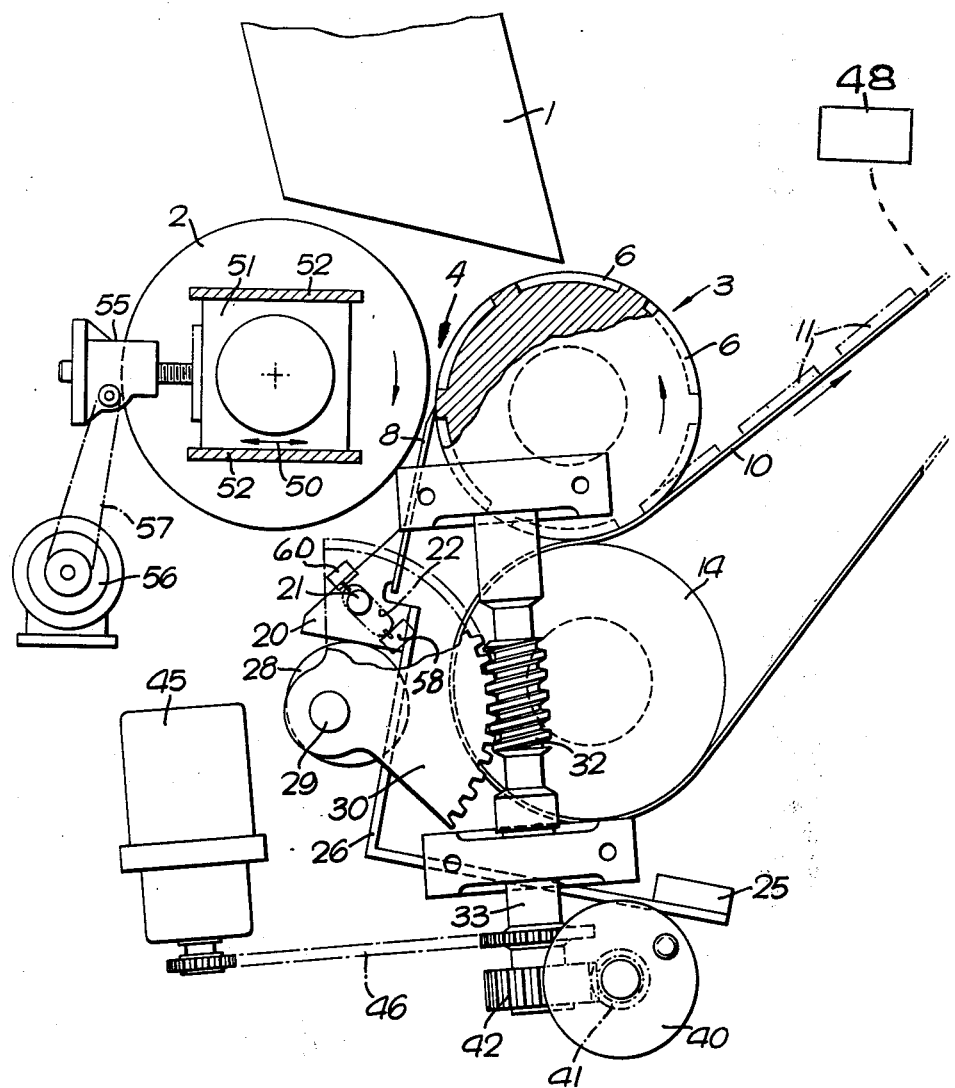

MOULDING OF DOUGH

This invention relates to rotary moulding machines for biscuits, that is to say for moulding pieces of dough in the production of biscuits. Such machines have been known for about half a century and are described, for example, in "Biscuits, Crackers and Cookies" Volume 1, page 235 by W. H. Smith. The dough to be moulded is contained in a hopper, the bottom of which is defined by a pair of co-operating rollers, one of which is referred to as the die roll or moulding roll, being formed with engraved recesses for the reception of dough and the other of which is referred to as the feed roll or forcing roll, having an embossed surface which grips the dough and feeds it downwardly and into contact with the surface of the moulding roll.

A scraper blade which bears against the surface of the moulding roll removes excess dough from the surface of this roll and effectively splits the downward stream of dough, causing any dough not accepted by the recesses in the moulding roll to be retained by the surface of the forcing roll and thus returned to the hopper. The pieces of dough contained in the recesses in the moulding roll are removed by contact with an extraction web or apron passing round a rubber covered extraction roll which presses the web against the surface of the moulding roll and causes the dough pieces to stick to the web rather than to the moulding roll, thus removing the moulded pieces of dough and then carrying them forwardly along a horizontal run of the extraction web from which they are subsequently removed and transferred to a further web in the form of a conveyor band.

These basic components of the machine have remained relatively unchanged since this type of machine was first introduced, although there has been room for improvement, particularly in relation to the consistency of weight of the moulded dough pieces. In theory, with substantially constant conditions, this weight should remain constant, but in practice, with minor variations in conditions such as the temperature, the consistency of the dough and so forth, appreciable variations are experienced.

In an attempt to regulate the weight of the dough pieces, various settings of the machine have been made adjustable such as the speed of the forcing roll, the gap between the forcing roll and the moulding roll, the extraction roll pressure and the position and action of the scraper blade. Adjustment of the scraper blade has proved the most useful in practice because it has the most direct controlling effect on the amount of dough pressed into each moulding recess. Two essential factors are involved, i.e., the vertical height of the knife edge of the blade, which controls the exact point at which the stream of dough is split and the angle of the knife edge at the surface of the moulding roll. The problem has been complicated by the fact that these two factors are inter-related and any adjustment in the height of the knife edge has in the past affected its position relative to the surface of the moulding roll. This position could be adjusted by a horizontal or an angular adjustment of the mounting of the blade and this has had to be carried out in conjunction with the vertical adjustment.

The position has been further complicated by the fact that before any adjustment can usefully be made, dough pieces have to be collected by hand for weighing after they have passed the stripping point where they leave the extraction web. This has the practical disadvantages of requiring the time of an operator for carrying out the sampling, weighing and adjustment and the fact that dough pieces which are removed for weighing cannot then be replaced for baking and cause both loss in through-put and upset the baking conditions for the adjacent pieces left on the band.

A more direct disadvantage arises from the considerable time lag between the removal of the biscuits and the completion of the adjustment. The weighing of several dough pieces and averaging this weight take an appreciable amount of time and, assuming that adjustment is made to the scraper blade, the inter-relation of the two adjustments referred to above makes this a relatively skilled and time-consuming operation. In fact, by the time the adjustment has been completed, the dough properties may have changed, requiring a still further adjustment. The position has been still further aggravated by the fact that both forms of adjustment to the scraper blade have been made by step mechanisms which have adversely affected the accuracy obtainable.

According to the present invention, a rotary moulding machine of the type referred to above, i.e., comprising basically a pair of co-operating rolls defining the bottom of a dough hopper, one roll having an embossed surface for feeding dough downwardly and into contact with the surface of the other or moulding roll which is formed with moulding recesses, and a scraper blade mounted to bear against the surface of the latter roll so as to divert dough into the moulding recesses and remove excess dough from the remainder of the surface, has the scraper blade carried by a pivoted mounting capable of infinitely variable adjustment along a path which guides the mounting in a direction having at least a substantial vertical component whilst maintaining the operating angle of the scraper blade with respect to the moulding roll, and a biasing arrangement is provided which exerts a turning moment on the mounting about the pivotal axis so as to press the scraper blade against the surface of the moulding roll.

The outcome of this is that during the adjustment of the vertical position of the scraper blade the angle of the blade and thus the working tip thereof with respect to the surface of the moulding roll remains substantially at a constant operating angle and the scraper is always in contact with the roll so that any necessary adjustment can be carried out very much more simply and quickly. It will be appreciated that since the bearing force depends solely on the turning moment exerted by the biasing arrangement, it is independent of any positional adjustment and that, moreover, by adjustment of the bias, it is possible to vary the bearing force without any positional adjustment.

Thus by a single simple adjustment the operator can move the working tip of the scraper from a zone of low dough pressure to a zone of high dough pressure or vice versa, thus altering the quantity of dough being parted off and extruded into the moulding recesses.

Whereas this greatly reduces the time required for adjustment, it does not affect the time taken for sampling and weighing. On the other hand, detectors are now available whereby the weight of individual dough pieces can be assessed without removing them from the conveyor band. Thus one form of device may be used to detect by a non-contacting or an optical method the average thickness of the dough pieces, or a nucleonic gauging unit may be used to detect the average nucleonic absorption which is related to the mass of the individual pieces. It has been found that the average thickness and the mass are directly correlated and thus by observing the output from the detector, any variation in the average weight of the dough pieces is immediately obvious and the operator can take rapid corrective action.

The use of such devices has not previously been thought justified since the time taken in making any necessary adjustment has been so long that it has effectively nullified any advantage gained by the use of such a detector. The combination of a detector of this type and a form of adjustment in accordance with the present invention, however, enables the advantages of both parts of the combination to be much more fully realised.

Even greater advantage is obtained if, as a preferred feature of the invention, the output of the detector is used to control the adjustment by way of a servomotor or similar power-operated device, so that the operation is effectively automatic and the operator is required only in a supervisory capacity. As long as the average weight of the dough pieces remains at the correct value, the servomotor is not actuated and the scraper blade maintains a fixed position. On the other hand, if the average weight tends to increase, the servomotor operates to lower the scraper blade slightly to operate in a zone of lower dough pressure until the weight returns to the correct value while if the weight tends to decrease, the servomotor runs in the opposite direction to raise the blade.

These adjustments are effected on a continuous or infinitely variable basis and without significantly affecting the bearing angle of the blade against the moulding roll. If required, the pressure exerted by the blade can be adjusted quite independently of the position of the blade, but in general, the pressure will be set when the machine is commissioned and will not then subsequently need to be adjusted.

In order to allow the mounting for the scraper blade to be capable of the required movement, the path of adjustment of the mounting may be defined by a slot co-operating with a pin defining the pivotal axis, relative movement between the two being controlled by a rotary cam. More specifically, the pin may be fixed to the scraper assembly, the slot being formed in a plate fixed to the machine framework which may have a straight slot inclined at an appropriate angle, e.g., approximately 45° to the vertical. The inclination of the slot causes any raising of the scraper to produce a simultaneous horizontal movement of the base of the scraper blade in a direction away from the moulding roll so that the angle of the blade to the scraped surface is substantially constant, the tip of the blade being maintained in contact with the surface of the moulding roll by the biasing arrangement previously referred to.

Owing to the sensitivity of the control and the relatively small degree of adjustment of the scraper blade which is obtainable over the whole range of the adjusting arrangement, it may be possible, if the weight of the dough pieces departs from the correct value to a major extent that the range of adjustment will not be sufficient. To allow for this possibility, the reaching of the limit of the adjustment may be caused to switch on a second servomotor so as to adjust the gap between the forcing roll and the moulding roll. Alternatively, this further adjustment may be carried out manually. Once the second adjustment has been made, further re-adjustment of the scraper blade will be required, but this will be carried out rapidly and automatically by the control system forming the subject matter of the present invention.

An example of a machine in accordance with the invention will now be described in more detail, with reference to the accompanying drawing which is an elevation, partly in section.

The machine is of a basically known type as previously described and comprises a dough hopper 1, the bottom of which is defined by a pair of co-operating rolls 2 and 3 driven respectively in a clockwise and anti-clockwise direction as indicated by the arrows. The roll 2 has an embossed surface and constitutes the so-called forcing roll for feeding dough downwardly into the nip 4 between the two rolls, while the roll 3 is formed with a pattern of moulding recesses 6 to constitute the moulding roll. A scraper blade 8 bearing against the surface of the moulding roll 3 removes excess dough from the surface of this roll and effectively splits the downward stream of dough, causing any dough not accepted by the recesses 6 to be retained by the surface of the forcing roll 2 and thus returned to the hopper 1. The pieces of dough contained in the recesses 6 and which are effectively pressed into these recesses by the pressure of the dough as it is parted by the blade 8 are removed by contact with an extraction web 10 and are illustrated in dotted lines as 11. The web 10 passes around a rubber covered extraction roll 14 which presses the web against the surface of the moulding roll 3 and causes the dough pieces to stick to the web rather than to the moulding roll. The dough pieces 11 are then carried upwardly and to the right as indicated by the arrow and are subsequently removed from the web and transferred to a further web in the form of a conveyor band.

The components so far described all form part of the well known type of machine, the novel features of the machine in accordance with the invention being constituted by the mounting for the scraper blade 8 and the associated adjustment mechanism. The mounting for the scraper blade 8 comprises a generally triangular-shaped plate 20 provided with a pin 21 which co-operates with a slot 22 formed in a plate (not shown) which is fixed to the framework of the machine (also not shown). The pin and slot connection constituted by the pin 21 and the slot 22 enables pivotal movement of the mounting about the pin 21 and translational movement along a path defined by the slot 22. The pivotal movement is controlled by a weight 25 mounted at the end of an L-shaped arm 26 extending downwardly and to the right from the triangular plate 20, thus producing a turning moment about the pin 21 so as to press the scraper blade 8 against the surface of the moulding roll 3 with a force which depends on the magnitude of the weight 25 and on the effective lever arm defined by the arm 26.

Translational movement is controlled by a cam 28 in the form of an eccentric bearing against the underside of the triangular plate 20 and turning with a shaft 29 which also carries a toothed, sector-shaped plate 30. The toothed plate 30 meshes with a worm drive 32 on a shaft 33 so that rotation of the latter produces correspondingly smaller rotation of the sector plate 30 and hence rotation of the cam 28, leading to displacement of the plate 20 and the scraper blade 8 in a direction determined by the inclination of the slot 22. The inclination of the slot ensures that any adjustment of the blade 8 in a vertical direction, which may be required to compensate for any variation in the average weight of the dough pieces 11, is accompanied by movement in a horizontal direction so that the angle of the scraper blade 8 remains substantially constant, its working tip being held in contact with the surface of the moulding roll 3 by the biasing arrangement already described.

The shaft 33 may be turned either by means of a hand wheel 40 by way of meshing bevel gears 41 and 42, or by way of a servomotor 45 by way of a chain drive 46. Generally speaking, the hand wheel 40 is used for initial setting of the scraper blade 8 at the beginning of the run, the control thereafter being taken over by the servomotor 45 to provide automatic control in accordance with the average weight of the dough pieces 11. The servomotor 45 is controlled in its turn by means of a detector referred to previously, and shown as 48 in the drawing. This detector forms no part of the present invention, but operates to assess the weight of individual dough pieces without removing them from the conveyor band. For example, the weight may be measured indirectly by the use of a non-contacting or optical method for gauging the average thickness of the dough pieces or a nucleonic gauging unit may be used to detect the average nucleonic absorption which is related to the mass of the individual pieces. For example, a device known as the Heightscan Gauge, sold by Integrated Photometrics Limited, is well suited for the purpose and a sensing device as described in British patent specification No. 1,166,454 may also be used.

As a result of the adjusting mechanism just described, the scraper blade 8 is adjusted automatically in accordance with any variations in the average weight of the dough pieces 11 in such a way as to cancel out such variations and thus maintain the average weight substantially constant. The use of a worm drive in the manner described means that each revolution of the worm produces only a few thousandths of an inch adjustment of the scraper blade 8, thus providing a very sensitive and infinitely variable adjustment. The amount of bias provided by the weight 25 can readily be adjusted either by adjustment of the weight itself or by adjustment of its distance from the pivotal axis. In practice, however, the bias will be set when the machine is first commissioned and will not then subsequently need to be adjusted.

The range of adjustment of the scraper blade 8 is determined by the range of rotation of the toothed plate 30, i.e., somewhat less than half a revolution. Since the degree of eccentricity of the cam 28 is not very great, the range of translational movement of the blade 8 is also relatively small and may not be sufficient to compensate for a major departure of the weight of the dough pieces from the correct value. To allow for this possibility, the nip between the forcing roll 2 and the moulding roll 3 is adjustable by movement of the forcing roll 2 as indicated by arrow 50, the bearing housing 51 of the roll being slidable in guides shown diagrammatically in cross section as 52. Movement of the bearing housing 51 is controlled by a screw jack 55 driven from a servomotor 56 by a chain drive 57.

When the scraper blade 8 reaches the limit of its adjustment in either direction, a limit switch 58 or 60 is closed to start the servomotor 56 and thus to adjust the nip between the rolls 2 and 3 in the appropriate direction to supplement the adjustment of the blade 8. As soon as this further adjustment starts to take effect, further re-adjustment of the blade 8 occurs automatically as previously described and since this causes the blade to move away from its limiting position, the limit switch is opened and further adjustment of the nip then stops. Manual adjustment of the screw jack 55 by a hand wheel (not shown) is also possible in order to assist in the initial adjustment of the apparatus prior to the start of operation.

We claim:

1. In a rotary moulding machine for biscuit dough having a dough hopper with an open bottom, a driven forcing roll having an embossed surface for feeding dough downwardly, a driven moulding roll having a surface formed with moulding recesses, said rolls co-operating to define a nip beneath said hopper, a scraper blade, a mounting for said scraper blade, a biasing arrangement for pressing said scraper blade against the surface of said moulding roll to press dough into said moulding recesses and means for extracting moulded dough pieces from said recesses, the improvement comprising: means for freely pivoting said mounting about an axis, means for effecutating an infinitely variable adjustment of said mounting, means responsive to said means for adjustment for defining a path guiding said mounting in a first direction having at least a substantial vertical component and a second direction having a horizontal component to orient said scraper blade with respect to the surface of said moulding roll to maintain a substantially constant operating angle of said scraper blade with respect to said surface of said moulding roll, a detector for measuring the average weight of said extracted moulded dough pieces, and a power operated device responsive to the output of said detector for controlling said means for effectuating an infinitely variable adjustment in accordance with variations in said average weight.

2. In a rotary moulding machine for biscuit dough having a dough hopper with an open bottom a driven forcing roll having an embossed surface for feeding dough downwardly, a driven moulding roll having a surface formed with moulding recesses, said rolls co-operating to define a nip beneath said hopper, a scraper blade, a mounting for said scraper blade, a biasing arrangement for pressing said scraper blade against the surface of said moulding roll to press dough into said moulding recesses and means for extracting moulded dough pieces from said recesses, the improvement comprising: means for freely pivoting said mounting about an axis, means for effectuating an infinitely variable adjustment of said mounting, means responsive to said means for adjustment for defining a path guiding said mounting in a first direction having at least a substantial vertical component and a second direction having a horizontal component to orient said scraper blade with respect to the surface of said moulding roll, a detector for measuring the average weight of said extracted moulded dough pieces, and a power operated device responsive to the output of said detector for controlling said means for effectuating an infinitely variable adjustment in accordance with variations in said average weight.

3. A rotary moulding machine as claimed in claim 2, in which said power operated device is a servomotor.

4. A rotary moulding machine as claimed in claim 2 in which said means responsive to said adjustment defining the path for guiding said mounting is formed with a slot defining said path, said freely pivoting means comprise a pin co-operating with said slot and said infinitely variable adjustment means includes a rotary cam controlling relative movement between said pin and said slot.

5. A rotary moulding machine as claimed in claim 4, and including a worm drive for controlling rotation of said cam.

6. A rotary moulding machine as claimed in claim 2, in which said biasing arrangement comprises an arm projecting laterally from said mounting and a weight on said arm to exert a turning moment about said pivotal axis.

7. A rotary moulding machine as claimed in claim 2 and including a mechanism for adjusting said forcing roll towards and away from said moulding roll and means responsive to said mounting reaching an end of adjustment on said path of movement for initiating operation of said mechanism.

8. A rotary moulding machine as claimed in claim 7 in which said mechanism includes a screw jack connected to said forcing roll and said responsive means is a servo-motor connected to drive said jack.

* * * * *